United States Patent [19]

Mounier-Poulat et al.

[11] Patent Number: 5,020,824
[45] Date of Patent: Jun. 4, 1991

[54] DEVICE FOR MOUNTING A COMPOSITE MATERIAL LEAF SPRING

[75] Inventors: Francois Mounier-Poulat; Marcel Savoie, both of Heyrieux; Raymond Armanet, Chatonnay, all of France

[73] Assignee: Renault Vehicules Industriels, Lyon, France

[21] Appl. No.: 402,456

[22] Filed: Sep. 5, 1989

[30] Foreign Application Priority Data

Sep. 2, 1988 [FR] France ................. 88-11484

[51] Int. Cl.⁵ ............... B60G 5/00; B60G 11/04; B60G 11/38
[52] U.S. Cl. ................. 280/686; 280/718; 280/715; 280/716; 267/266; 267/269; 267/52; 267/30; 267/44
[58] Field of Search ............... 280/104, 676, 686, 718, 280/720, 715, 716; 267/44, 266, 269, 52, 30

[56] References Cited

U.S. PATENT DOCUMENTS

| | | | |
|---|---|---|---|
| 1,587,509 | 6/1926 | Coutant | 267/52 |
| 2,775,353 | 12/1956 | Tillou | 267/30 |
| 3,149,855 | 9/1964 | Adloff et al. | 267/52 |

FOREIGN PATENT DOCUMENTS

| | | |
|---|---|---|
| 0137096 | 4/1985 | European Pat. Off. . |
| 0161155 | 11/1985 | European Pat. Off. . |
| 0183599 | 6/1986 | European Pat. Off. . |
| 0263388 | 4/1988 | European Pat. Off. . |
| 1158321 | 6/1958 | France . |

*Primary Examiner*—Charles A. Marmor
*Assistant Examiner*—Tamara L. Finlay
*Attorney, Agent, or Firm*—Oblon, Spivak, McClelland, Maier & Neustadt

[57] ABSTRACT

A suspension for a vehicle having tandem axles includes a composite leaf spring connected between the axles. The leaf spring is constrained to bend about a transverse axis by a fixed elastic support having a concave, arcuate bottom surface whose center coincides with the transverse axis. The elastic support engages the top surface of the leaf spring at two points on opposite sides of the transverse axis, and is opposed by a central elastic element. The ends of the leaf spring are connected to the tandem axles by ball joints having elastic pads.

6 Claims, 2 Drawing Sheets

DEVICE FOR MOUNTING A COMPOSITE MATERIAL LEAF SPRING

BACKGROUND OF THE INVENTION

1. Field of the Invention

This invention relates to a device for mounting a composite material leaf spring, in particular for tandem axles of an industrial vehicle.

2. Related art

The known tandem axles are guided in the lengthwise direction and in the crosswise direction by connecting rod systems. The vehicular load is applied to the center of a leaf spring for the tandem axles by a central ring joint. These leaf springs can also be used for crosswise retention of the axles. Such a system is shown in French Patent Application No. 84-L- 17498.

Generally, and more particularly for 6×4 vehicles such as tank cars, mixer carriers, etc., the weight of unsuspended elements must be a minimum. In the known systems, the weight of the leaf springs and their joints represents about 50% of the total weight of the suspension elements.

SUMMARY OF THE INVENTION

It is an object of the present invention to provide a suspension with a reduced weight and a simplified structure.

It is a further object of the invention to provide a suspension having a leaf spring formed of a composite material.

The above, and other, objects are achieved according to the present invention by a vehicle suspension comprising tandem axles suspended from a vehicle frame portion, an elongate composite leaf spring having ends respectively coupled to the axles by coupling means, and support means for bending a central part of the leaf spring about an axis transverse to the length of the leaf spring. The support means comprise a concave arcuate elastic support fixed relative to the vehicle frame portion and engaging the first horizontally extending surface of the leaf spring at two points spaced along the longitudinal axis of the leaf spring, the two points being on opposite sides of the transverse axis. The support means thus act as a fulcrum to bend the leaf spring about the transverse axis in response to vertical loads on the axles.

According to the further feature of the invention, the coupling means each comprise a ball joint connected to a second horizontally extending surface of the leaf spring, each of the ball joints pivoting about a center fixed to a respective one of the tandem axles and lying substantially in a vertical plane passing through a rotational center of the tandem axle.

According to a further feature of the invention, each of the elastic supports comprise a laminated body formed of elastic leaves and having a concave, arcuate surface with edges contacting and fixed to the first surface of the leaf spring at the two points. A center of the concave, arcuate surface lies substantially on the transverse axis.

The composite leaf spring can be formed of a conventional composite material, and should preferably have the fibers of the composite material extending parallel to the longitudinal axis, so that the leaf spring has the ability to elastically resist bending stresses along the longitudinal direction. However, it is a characteristic of composite materials that their ability to resist stresses is asymmetric. Thus, a composite leaf spring must be connected to the vehicle suspension in such a way that stresses other than longitudinal bending stresses of the leaf spring are minimized, since the leaf spring cannot easily compensate for such other stresses. The central support and ball joints of the present invention minimize such additional stresses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
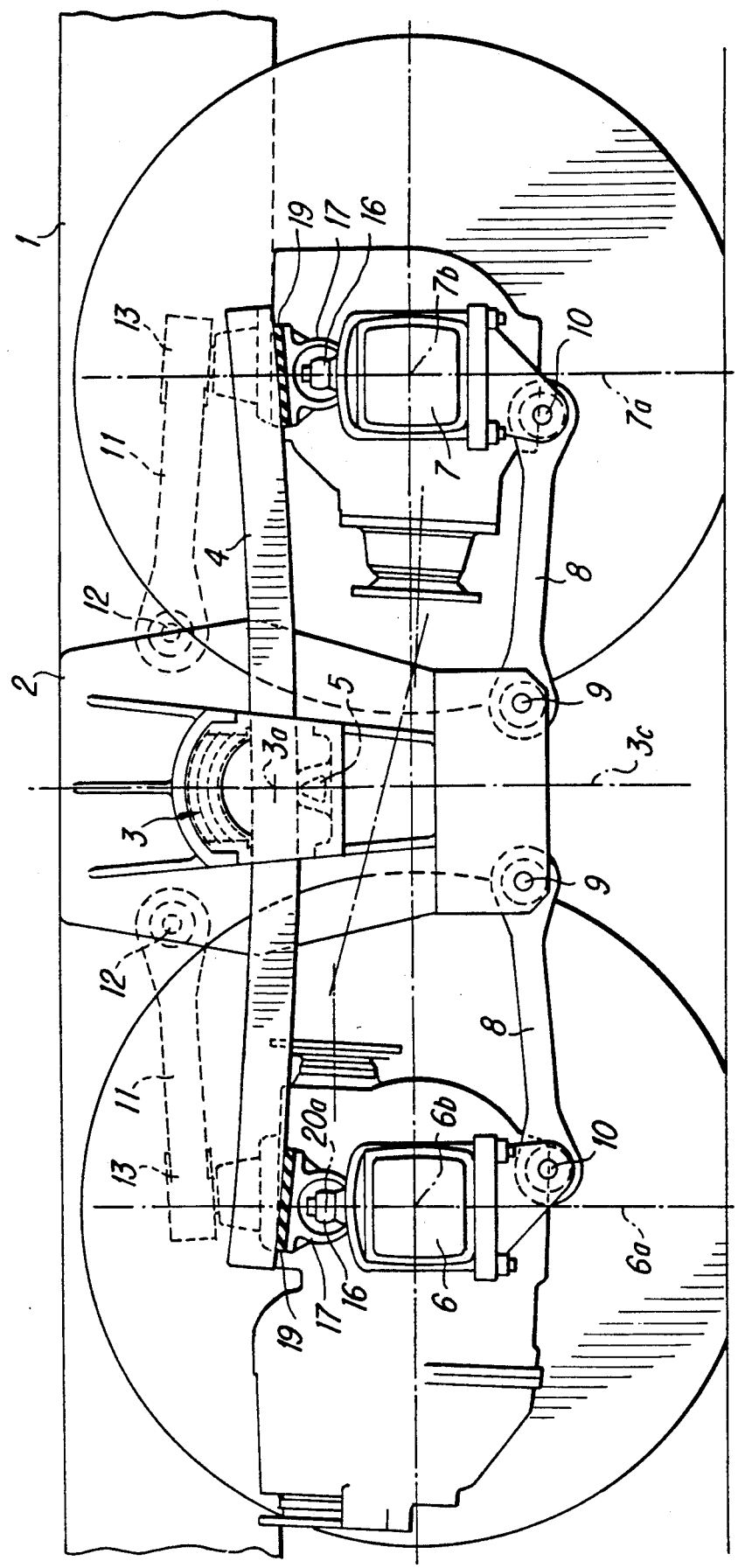
FIG. 1 shows in side elevation the devices for connecting the composite leaf spring to the tandem axles and the frame, according to the invention.

According to the preferred embodiment seen in FIG. 1, a central fitting 2 is mounted on the outside part of side frame member 1 of a vehicle. The central fitting carries central support 3, a composite leaf spring 4 having fibers oriented lengthwise, and an elastic element 5 responsible for flattening the leaf spring 4 on the central fitting 2 when the suspension is completely relieved (such as during maintenance operations in the garage). Front axle 6 and rear axle 7 are guided for vertical movement relative to the vehicle by lower lateral links 8 pivoted at 9 on central fitting 2 and at 10 on the lower part of each axle.

The front and rear axles 6 and 7 are also guided by A-arms 11 pivoted at 12 on the central fitting 2 and ball-jointed at 13 in the center of their upper part.

This device, a known suspension structure generally shown in French patent application 84-17498, assures correct guidance of the axles and applies leaf spring 4 with lengthwise stresses. But the composite material must be installed so as to eliminate all additional stresses (shearing, crosswise bending, torsion) connected with flanging systems and with assemblies currently used.

Figure 2:
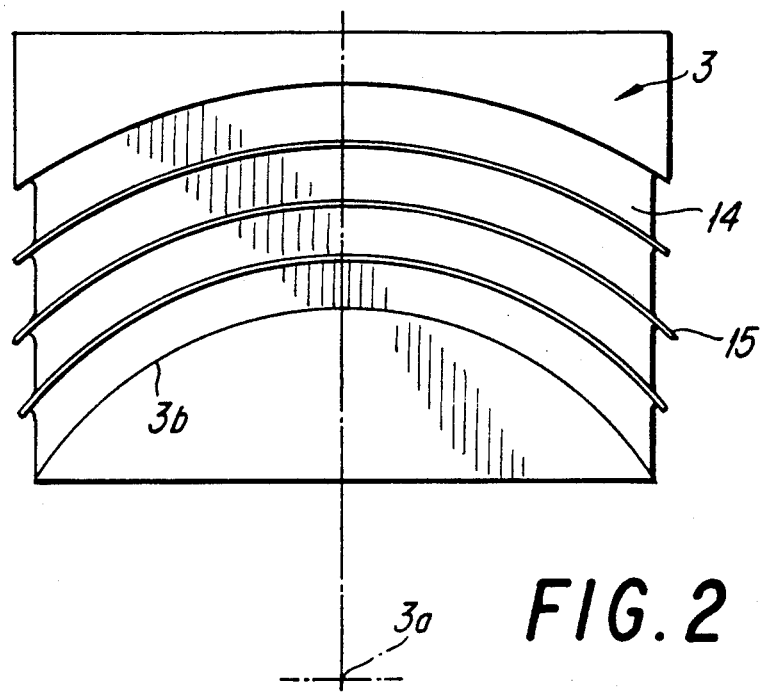
FIG. 2 shows a curved, laminar, elastic central support.

The central support 3 of the invention, shown in FIG. 2, is an elastic laminated support comprising rubber leaves 14 adhered to curved, interposed metal plates 15 and having an arcuate, concave bottom surface 3b along an arc whose center is located in the middle of the thickness of leaf spring 4 and substantially on vertical plane 3c, at the bending center 3a of the leaf spring. In this way, a pivoting of the leaf spring around an imaginary axis 3a is achieved without jointing, which is advantageous as the cost of the mechanism and its maintenance are zero. Further, the elasticity of the support absorbs well the possible angular movements to which this part of the leaf spring is subjected.

This central support 3 can be held on the upper face of the leaf spring by gluing or any other known means.

Keeping central support 3 in place in central fitting 2 is provided by a system such as an elastic stud 5, known in the art, which generates an opposite vertical force. This device is intended to flatten the leaf spring 4 in central fitting 2 in case of suspension relief.

Figure 3:
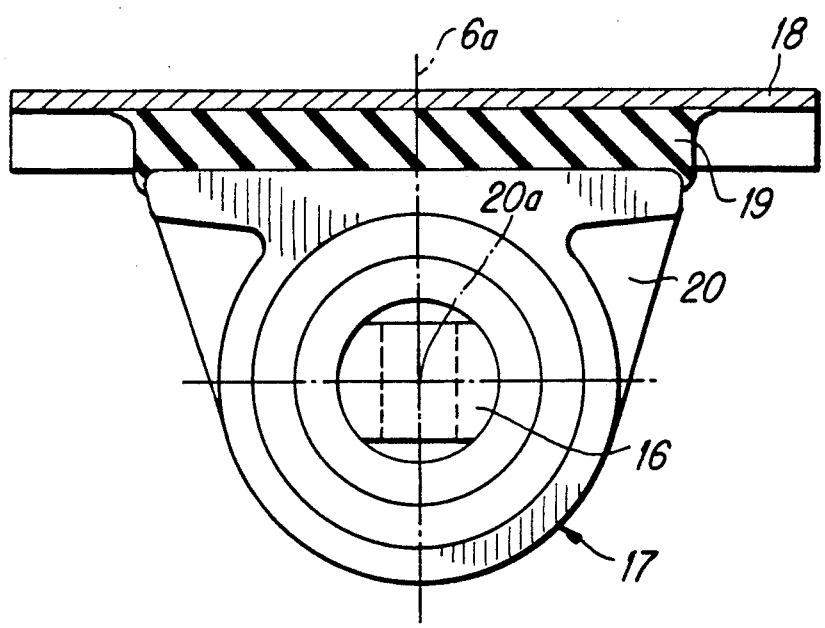
FIG. 3 shows one of the supports of the leaf on one of the axles. It is a combined ball joint and elastic pad unit.

FIG. 3 shows an embodiment of a flexible connection ball-jointed between each end of the leaf spring and the corresponding part of the axle.

The ball of each ball joint 16 moves in a bearing 17 fastened on the end of axle 7 or 8. The rotational center 20a of the ball joint is fixed to a respective axle 6 or 7 in a vertical plane 6a or 7a passing through the rotation center 6b or 7b of the respective axis. This bearing comprises a sole plate 18 that is mounted on the end of the leaf spring by known means, such as a flange system. Frame 20 receiving ball joint 16 is connected to sole plate 18 by a rubber plate 19 made to adhere to both sole plate 18 and frame 20, whose role is to absorb the slight longitudinal travels of the corresponding end of leaf spring 4.

Obviously, numerous modifications and variations of the present invention are possible in light of the above teachings. It is therefore to be understood that within the scope of the appended claims, the invention may be practiced otherwise than as specifically described herein.

What is new and desired to be secured by LETTERS PAT. of the U.S. is:

1. A vehicle suspension comprising:
   tandem axles suspended from a vehicle frame portion;
   an elongate composite leaf spring having ends respectively coupled to said axles by coupling means; and
   support means for bending a central part of said leaf spring about an axis transverse to the length thereof,
   wherein said support means comprises a concave, arcuate elastic support fixed relative to said vehicle frame portion and engaging a top horizontally extending surface of said leaf spring at two points spaced along the length thereof, said two points being on opposite sides of said transverse axis,
   whereby said support means acts as a fulcrum to bend said leaf spring about said transverse axis in response to vertical loads on the axles,
   wherein said coupling means each comprises a ball joint connected to a bottom horizontally extending surface of said leaf spring, each said ball joint pivoting about a center fixed to a respective one of said tandem axles and lying substantially in a vertical plane passing through a rotational center of said tandem axle.

2. The suspension of claim 2 including a rubber plate connected between said center of said ball joint and said leaf spring for absorbing longitudinal movements of said ends of said leaf spring during bending thereof.

3. The suspension of claim 2 wherein said elastic support comprises a laminated body formed of elastic leaves and having a concave, arcuate surface with edges contacting and fixed to said top surface of said leaf spring at said two points, and wherein a radial center of said concave, arcuate surface lies substantially on said transverse axis.

4. The suspension of claim 1 including an elastic element fixed to said vehicle frame portion and pressing on said bottom surface of said leaf spring at a longitudinal position substantially corresponding to said transverse axis.

5. A vehicle suspension comprising:
   tandem axles suspended from a vehicle frame portion;
   an elongate composite leaf spring having ends respectively coupled to said axles by coupling means; and
   support mans for bending a central part of said leaf spring about an axis transverse to the length thereof,
   wherein said support means comprises a concave, arcuate elastic support fixed relative to said vehicle frame portion and engaging a top horizontally extending surface of said leaf spring at two points spaced along the length thereof, said two points being on opposite sides of said transverse axis,
   whereby said support means acts as a fulcrum to bend said leaf spring about said transverse axis in response to vertical loads on said axles,
   wherein said elastic support comprises a laminated body formed of elastic leaves and having a concave, arcuate surface with edges contacting and fixed to said top surface of said leaf spring at said two points, and wherein a radial center of said concave, arcuate surface lies substantially on said transverse axis.

6. The suspension of claim 5 including metal plates between said elastic leaves.

* * * * *